United States Patent
Chu et al.

(10) Patent No.: US 10,581,580 B2
(45) Date of Patent: *Mar. 3, 2020

(54) ACKNOWLEDGEMENT OF TRANSMISSIONS IN A WIRELESS LOCAL AREA NETWORK

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,722

(22) Filed: Apr. 29, 2019

(65) Prior Publication Data

US 2019/0253227 A1    Aug. 15, 2019

Related U.S. Application Data

(63) Continuation of application No. 15/438,578, filed on Feb. 21, 2017, now Pat. No. 10,277,376.

(Continued)

(51) Int. Cl.
*H04L 5/00* (2006.01)
*H04L 1/16* (2006.01)
(Continued)

(52) U.S. Cl.
CPC ......... *H04L 5/0055* (2013.01); *H04B 7/0452* (2013.01); *H04L 1/1614* (2013.01);
(Continued)

(58) Field of Classification Search
None
See application file for complete search history.

(56) References Cited

U.S. PATENT DOCUMENTS 7,599,332 B2   10/2009   Zelst et al.
7,742,390 B2    6/2010   Mujtaba
(Continued)

FOREIGN PATENT DOCUMENTS

WO   WO-2012/162576   11/2012
WO   WO-2015/077547    5/2015

OTHER PUBLICATIONS

U.S. Appl. No. 16/430,034, Chu et al., "Acknowledgement of Transmissions in a Wireless Local Area Network," filed Jun. 3, 2019.

(Continued)

*Primary Examiner* — Candal Elpenord

(57) ABSTRACT

A first communication device receives an aggregate medium access control data unit (MAC) protocol data unit (A-MPDU) that aggregates multiple MAC protocol data units from a second communication device. The first communication device generates an acknowledgment data unit that includes a length indication that indicates a length of an acknowledgement field and the acknowledgment field of the indicated length. The length of the acknowledgement field is selected from a subset of predetermined lengths, among a set predetermined lengths, that includes multiple predetermined lengths that do not exceed a maximum number of MAC protocol data units that can be included in the A-MPDU. The maximum number of MAC protocol data units is limited by a buffer size negotiated in an acknowledgement setup procedure previously conducted between the first communication device and the second communication device. The first (Continued)

communication device transmits the acknowledgment data unit to the second communication device.

20 Claims, 12 Drawing Sheets

Related U.S. Application Data

(60) Provisional application No. 62/323,400, filed on Apr. 15, 2016, provisional application No. 62/304,570, filed on Mar. 7, 2016, provisional application No. 62/298,057, filed on Feb. 22, 2016, provisional application No. 62/297,236, filed on Feb. 19, 2016.

(51) Int. Cl.
*H04W 28/18* (2009.01)
*H04B 7/0452* (2017.01)
*H04L 12/851* (2013.01)
*H04L 27/26* (2006.01)
*H04W 84/12* (2009.01)

(52) U.S. Cl.
CPC ........ *H04L 1/1671* (2013.01); *H04L 27/2601* (2013.01); *H04L 47/2441* (2013.01); *H04W 28/18* (2013.01); *H04W 84/12* (2013.01)

(56) References Cited

U.S. PATENT DOCUMENTS

| | | | |
|---|---|---|---|
| 8,155,138 B2 | 4/2012 | van Nee | |
| 8,289,869 B2 | 10/2012 | Sawai | |
| 8,526,351 B2 | 9/2013 | Fischer et al. | |
| 8,571,010 B1 | 10/2013 | Zhang et al. | |
| 8,619,907 B2 | 12/2013 | Mujtaba et al. | |
| 8,724,720 B2 | 5/2014 | Srinivasa et al. | |
| 9,166,660 B2 | 10/2015 | Chu et al. | |
| 9,197,298 B2 | 11/2015 | Kim et al. | |
| 9,729,214 B2 | 8/2017 | Chu et al. | |
| 10,277,376 B2 | 4/2019 | Chu et al. | |
| 10,278,224 B2 | 4/2019 | Chu et al. | |
| 2005/0265302 A1* | 12/2005 | Nishibayashi | H04L 45/00 370/349 |
| 2005/0270978 A1 | 12/2005 | Haines | |
| 2007/0086374 A1 | 4/2007 | Jang et al. | |
| 2007/0186134 A1 | 8/2007 | Singh et al. | |
| 2008/0112350 A1 | 5/2008 | Nanda et al. | |
| 2009/0063804 A1 | 3/2009 | Trainin | |
| 2009/0067396 A1 | 3/2009 | Fischer | |
| 2009/0092110 A1* | 4/2009 | Taki | H04L 1/0002 370/338 |
| 2009/0196163 A1 | 8/2009 | Du | |
| 2009/0268709 A1 | 10/2009 | Yu | |
| 2010/0220678 A1 | 9/2010 | Wentink | |
| 2010/0329236 A1 | 12/2010 | Sampath et al. | |
| 2011/0002219 A1 | 1/2011 | Kim et al. | |
| 2011/0090855 A1 | 4/2011 | Kim | |
| 2011/0235593 A1 | 9/2011 | Gong et al. | |
| 2011/0261708 A1 | 10/2011 | Grandhi | |
| 2011/0286377 A1 | 11/2011 | Sampath et al. | |
| 2012/0314697 A1 | 12/2012 | Noh et al. | |
| 2013/0223345 A1 | 8/2013 | Asterjadhi et al. | |
| 2013/0229996 A1 | 9/2013 | Wang et al. | |
| 2013/0230059 A1 | 9/2013 | Quan et al. | |
| 2013/0301569 A1 | 11/2013 | Wang et al. | |
| 2015/0063190 A1 | 3/2015 | Merlin et al. | |
| 2015/0092652 A1 | 4/2015 | Ramamurthy et al. | |
| 2015/0103767 A1 | 4/2015 | Kim et al. | |
| 2015/0131517 A1 | 5/2015 | Chu et al. | |
| 2015/0146654 A1 | 5/2015 | Chu et al. | |
| 2015/0146699 A1 | 5/2015 | Wentink et al. | |
| 2015/0288501 A1 | 10/2015 | Kwon et al. | |
| 2015/0365940 A1 | 12/2015 | Chu et al. | |
| 2016/0028452 A1 | 1/2016 | Chu et al. | |
| 2016/0029373 A1 | 1/2016 | Seok | |
| 2016/0182205 A1 | 6/2016 | Asterjadhi et al. | |
| 2016/0323879 A1 | 11/2016 | Ghosh et al. | |
| 2017/0055300 A1 | 2/2017 | Pitchaiah | |
| 2017/0078003 A1 | 3/2017 | Ghosh et al. | |
| 2017/0093547 A1 | 3/2017 | Merlin et al. | |
| 2017/0111951 A1 | 4/2017 | Chu et al. | |
| 2017/0188390 A1 | 6/2017 | Adachi et al. | |
| 2017/0202026 A1 | 7/2017 | Ahn et al. | |
| 2017/0279864 A1 | 9/2017 | Chun et al. | |
| 2017/0359152 A1 | 12/2017 | Li et al. | |
| 2018/0145801 A1 | 5/2018 | Wang et al. | |
| 2018/0324638 A1 | 11/2018 | Chu et al. | |
| 2018/0332502 A1 | 11/2018 | Chu et al. | |

OTHER PUBLICATIONS

"The Authoritative Dictionary of IEEE Standards Terms," IEEE 100 Seventh Edition, pp. 10 and 90, Dec. 11, 2000.
Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).
Asterjadhi et al., "Block Ack Generation and Selection Rules," IEEE Draft, doc IEEE 802.11-16/0616r2, 30 pages (May 14, 2016).
Boyd et al., "Convex Optimization," *Cambridge University Press*, pp. 1-728 (2004).
Brown, "G.hn: Draft text for G.9960 (2010) corrigendum 1," *International Telecommunication Union*, pp. 1-184 (Feb. 2011).
Brown, "G.hn: Draft text for G.9961 (2010) corrigendum 1," *International Telecommunication Union*, pp. 1-282 (Feb. 2011).
Chen, "Home Network Basis: Transmission Environments and Wired/Wireless Protocols," Prentice Hall, pp. 1-26 (Jul. 2003).
Cherian et al., "CIDs: Section 27.4," IEEE Draft, doc IEEE 802.11-17/0319r0, 20 pages (Mar. 12, 2017).
Chun et al. "Legacy Support on HEW frame structure," doc: IEEE 11-13/1057r0, *The Institute of Electrical and Electronics Engineers, Inc.*, pp. 1-8 (Sep. 2013).
Clausen, "Branch and Bound Algorithms—Principles and Examples," Department of Computer Science, University of Copenhagen, pp. 1-30 (Mar. 12, 1999).
Hazen, "OFDM or OFDMA?," Mobile Dev Design, 3 pages (Oct. 25, 2005); available at http://mobiledevdesign.com/learning-resources/ofdm-or-ofdma, last accessed Nov. 15, 2016.
Hiertz et al., "The IEEE 802.11 Universe," IEEE Communications Magazine, pp. 62-70, (Jan. 2010).
IEEE 802.20-PD-06; IEEE P 802.20™ V14, Draft 802.20 Permanent Document; <System Requirements for IEEE 802.20 Mobile Broadband Wireless Access Systems—Version 14>, 24 pages (Jul. 16, 2004).
IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).
IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).
IEEE P802.11n™/D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).
IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007)

(56) References Cited

OTHER PUBLICATIONS

"Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-92, (1999) Reaffirmed (Jun. 12, 2003).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).
IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft STANDARD for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).
IEEE Std 802.16-2009 (Revision of IEEE Std. 802.16-2004), IEEE Standard for Local and metropolitan area networks: Part 16: Air Interface for Broadband Wireless Access Systems, The Institute of Electrical and Electronics Engineers, Inc., 2082 pages (May 29, 2009).
IEEE Std 802.16a-2003 (Amendment to IEEE Std 802.16-2001) "IEEE Standard for Local and metropolitan area networks: Part 16:

(56) References Cited

OTHER PUBLICATIONS

Air Interface for Fixed Broadband Wireless Access Systems—Amendment 2: Medium Access Control Modifications and Additional Physical Layer Specifications for 2-11 GHZ," The Institute of Electrical and Electronics Engineers, Inc., pp. 1-292 (Apr. 1, 2003).
IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., pp. 1-864 (Feb. 28, 2006).
IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," The Institute of Electrical and Electronics Engineers, Inc., pp. 1-315 (Jun. 12, 2009).
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11:Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma.sub.--D7.0),pp. 1-1212 (2006).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
International Preliminary Report on Patentability in International Patent Application No. PCT/US2016/057978, dated May 3, 2018 (11 pages).
International Preliminary Report on Patentability in International Patent Application No. PCT/US2017/018761, dated Aug. 30, 2018 (17 pages).
International Search Report and Written Opinion in International Patent Application No. PCT/US2016/057978, dated Feb. 7, 2017 (16 pages).
International Search Report and Written Opinion in International Patent Application No. PCT/US2018/042768, dated Oct. 24, 2018 (14 pages).
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
ITU-T Recommendation G.9960, "Unified high-speed wireline-based home networking transceivers—System architecture and physical layer specification," *Int'l Telecommunication Union*, pp. 1-160 (Dec. 2011).
ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).

ITU-T Recommendation G.9961, "Unified high-speed wire-line based home networking transceivers—Data link layer specification," *Int'l Telecommunication Union*, pp. 1-220 (Jun. 2010).
ITU-T Recommendation G.9961, Amendment 1, "Unified high-speed wire-line based home networking transceivers—Data link layer specification," *Int'l Telecommunication Union*, pp. 1-80 (Sep. 2012).
ITU-T Recommendation G.9961, Amendment 2, "Unified high-speed wire-line based home networking transceivers—Data link layer specification," *Int'l Telecommunication Union*, pp. 1-44 (Apr. 2014).
ITU-T Recommendation G.9961, Corrigendum 1, "Unified high-speed wire-line based home networking transceivers—Data link layer specification," *Int'l Telecommunication Union*, pp. 1-158 (Dec. 2011).
ITU-T Recommendation G.9961, Corrigendum 2, "Unified high-speed wire-line based home networking transceivers—Data link layer specification," *Int'l Telecommunication Union*, pp. 1-122 (Jul. 2013).
ITU-T Recommendation G.9963, "Unified high-speed wireline-based home networking transceivers—Multiple input-multiple output specification" *Int'l Telecommunication Union*, pp. 1-90 (Dec. 2011).
Kim et al., "A High-Throughput MAC Strategy for Next-Generation WLANs," Sixth IEEE International Symposium on a World of Wireless Movile and Multimedia Networks (WoWMoM'05), pp. 278-285 (Jun. 2005).
Land et al., "An Automatic Method of Solving Discrete Programming Problems," Econometrica, vol. 28, No. 3, pp. 497-520 (Jul. 1960).
Lin et al., "Optimal and Near-Optimal Resource allocation Algorithms for OFDMA Networks," IEEE Transactions on Wireless Communications, vol. 8, No. 8, pp. 4066-4077 (Aug. 2009).
Maha et al., "Multi-User MIMO Communication: Basic Aspects, Benefits and Challenges," Intech, 22 pages (2013).
Merlin et al., "Trigger Frame Format," IEEE Draft, doc. IEEE 802.11-15/0877r1, vol. 802.11ax, No. 1, 16 pages (Jul. 13, 2015).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Notice of Allowance in U.S. Appl. No. 16/039,248, dated Jan. 18, 2019 (36 pages).
Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Seok et al., "HEW PPDU Format for Supporting MIMO-OFDMA," IEEE 802.11-14/1210r0, 16 pages, (Sep. 14, 2014).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Van Nee et al. "The 802.11n MIMO-OFDM Standard for Wireless LAN and Beyond," Wireless Personal Communications, vol. 37, pp. 445-453 (Jun. 2006).
Invitation to Pay Additional Fees and Partial International Search Report in International Patent Application No. PCT/US2017/018761, dated Jun. 7, 2017 (22 pages).
Stacey, "Resolution for CIDs 1118, 1119, 1122, Frame Body Size," IEEE 802.11-11 /039612, 4 pages (Mar. 15, 2011).

\* cited by examiner

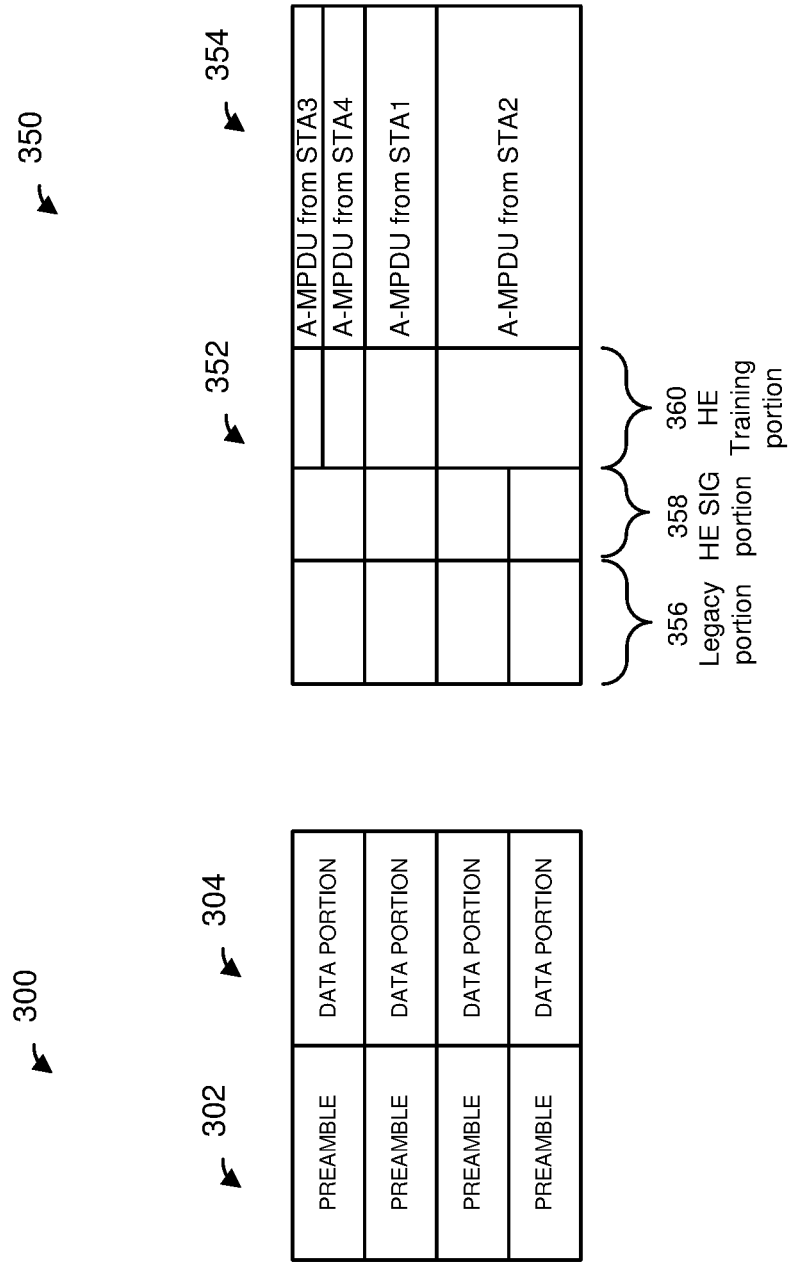

ACKNOWLEDGEMENT OF TRANSMISSIONS IN A WIRELESS LOCAL AREA NETWORK

CROSS-REFERENCE TO RELATED APPLICATION

This application is a continuation of U.S. patent application Ser. No. 15/438,578, now U.S. Pat. No. 10,277,376, entitled "Acknowledgement of Transmissions in a Wireless Local Area Network," filed on Feb. 21, 2017, which claims the benefit of the following U.S. Provisional Patent Applications:
- U.S. Provisional Patent Application No. 62/297,236, entitled "Acknowledgment of OFDMA A-MPDU with Multiple TCs" and filed on Feb. 19, 2016;
- U.S. Provisional Patent Application No. 62/298,057, entitled "Super BA Design," filed on Feb. 22, 2016;
- U.S. Provisional Patent Application No. 62/304,570, entitled "Acknowledgment of OFDMA A-MPDU with Multiple TCs" filed on Mar. 7, 2016; and
- U.S. Provisional Patent Application No. 62/323,400, entitled "Super BA Design," filed on Apr. 15, 2016.

The disclosures of all of the above-referenced patent applications are hereby incorporated by reference herein in their entireties.

This application is related to U.S. patent application Ser. No. 16/039,248, entitled "Acknowledgement of Transmissions in a Wireless Local Area Network," filed on Jul. 18, 2018.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to support both downlink (DL) and uplink (UL) multi-user (MU) transmissions, such as orthogonal frequency division multiple access (OFDMA) transmissions and multi-user multiple input multiple output (MU-MIMO) transmissions, and to provide even greater throughputs, such as throughputs in the tens of Gbps range.

SUMMARY

In an embodiment, a method for acknowledging a data unit, the method comprises: receiving, at a first communication device from a second communication device, a physical layer (PHY) data unit, wherein the PHY data unit includes an aggregate medium access control data unit (MAC) protocol data unit (A-MPDU) that aggregates multiple MAC protocol data units; generating, at the first communication device, an acknowledgment data unit to acknowledge receipt of the multiple MAC protocol data units, wherein the acknowledgment data unit includes (i) a length indication that indicates a length of an acknowledgement field, the length of the acknowledgement field being selected from a subset of predetermined lengths, among a set predetermined lengths, the subset including multiple predetermined lengths that do not exceed a maximum number of MAC protocol data units that can be included in the A-MPDU, the maximum number of MAC protocol data units being limited by a buffer size negotiated in an acknowledgement setup procedure previously conducted between the first communication device and the second communication device, and (ii) the acknowledgement field of the indicated length, wherein the acknowledgement field includes respective acknowledgement information for the multiple MAC protocol data units; and transmitting the acknowledgment data unit from the first communication device to the second communication device.

In another embodiment, a first communication device comprises a network interface having one or more integrated circuits configured to: receive, from a second communication device, a physical layer (PHY) data unit, wherein the PHY data unit includes an aggregate medium access control data unit (MAC) protocol data unit (A-MPDU) that aggregates multiple MAC protocol data units; generate an acknowledgment data unit to acknowledge receipt of the multiple MAC protocol data units, wherein the acknowledgment data unit includes (i) a length indication that indicates a length of an acknowledgement field, the length of the acknowledgement field being selected from a subset of predetermined lengths, among a set predetermined lengths, including multiple predetermined lengths that do not exceed a maximum number of MAC protocol data units that can be included in the A-MPDU, the maximum number of MAC protocol data units being limited by a buffer size negotiated in an acknowledgement setup procedure previously conducted between the first communication device and the second communication device, and (ii) the acknowledgment field of the indicated length, wherein the acknowledgement field includes respective acknowledgement information for the multiple MAC protocol data units; and cause the acknowledgment data unit to be transmitted to the second communication device.

In still another embodiment, a method for announcing maximum data unit length supported for reception by a first communication device comprises: generating, at the first communication device, a management data unit that includes (i) a maximum aggregate medium access control data unit (MAC) protocol data unit (A-MPDU) length field and (ii) an extension maximum A-MPDU length field for indicating a maximum length of a single A-MPDU that can be received by the first communication device, wherein generating the management data unit includes setting the maximum A-MPDU length field to indicate the maximum length if the maximum length is at most a first maximum length, and setting the extension maximum A-MPDU length field to indicate the maximum length if the maximum length exceeds the first maximum length; and transmitting the management data unit to one or more second communication devices, to announce the maximum supported A-MPDU length that can be received by the first communication device to the one or more second communication devices.

In yet another embodiment, a first communication device comprises a network interface having one or more integrated circuits configured to: generate a management data unit that includes (i) a maximum aggregate medium access control data unit (MAC) protocol data unit (A-MPDU) length field and (ii) an extension maximum A-MPDU length field for indicating a maximum length of a single A-MPDU that can be received by the first communication device, the one or more integrated circuits being configured to set the maximum A-MPDU length field to indicate the maximum length if the maximum length is at most a first maximum length, and set the extension maximum A-MPDU length field to indicate the maximum length if the maximum length exceeds the first maximum length; and cause the management data unit to be transmitted to one or more second communication devices, to announce the maximum supported A-MPDU length that can be received by the first communication device to the one or more second communication devices.

BRIEF DESCRIPTION OF THE DRAWINGS

FIGS. 3A-3C are block diagrams of example data units, according to embodiments;

DETAILED DESCRIPTION

Figure 1:
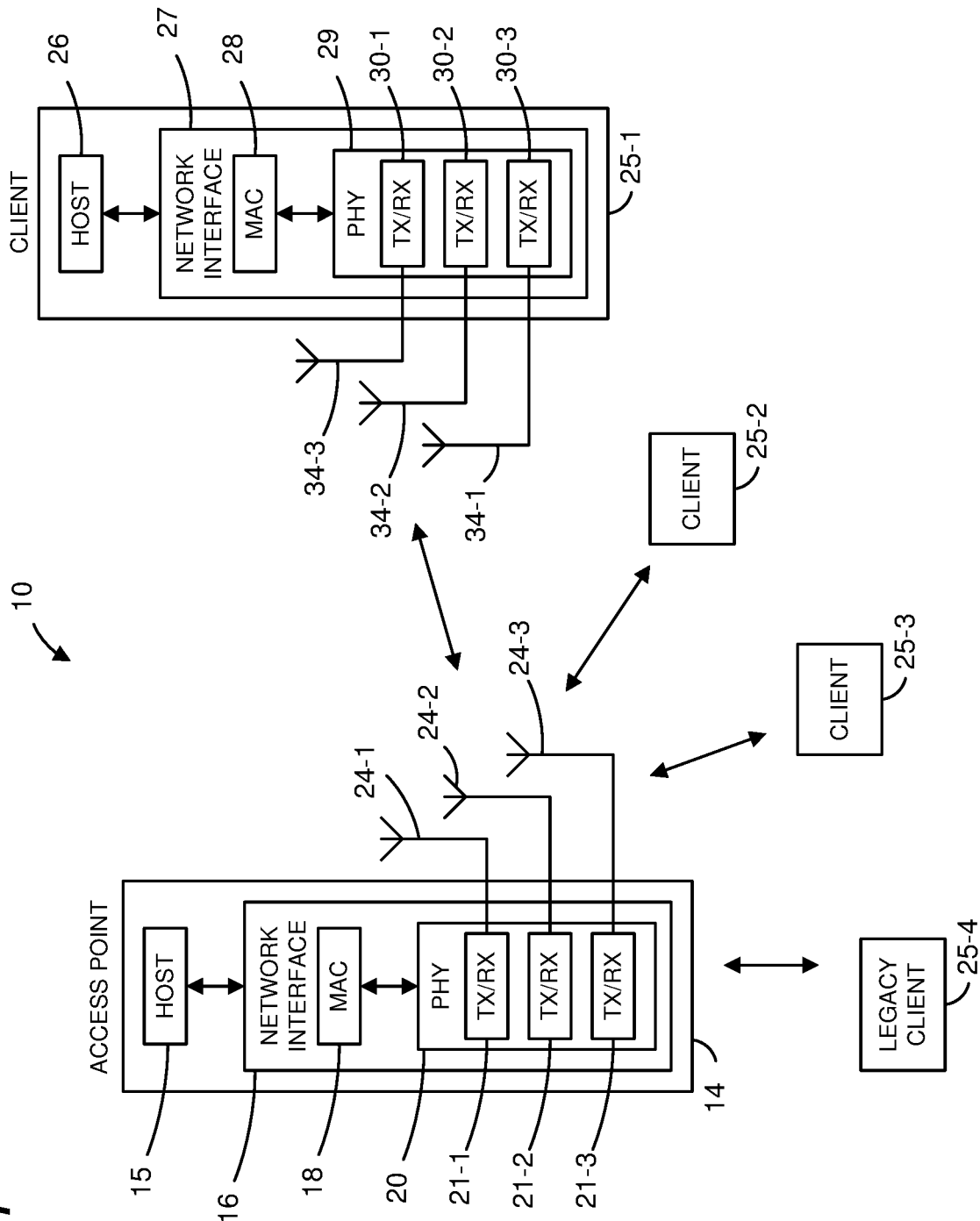
FIG. 1 is a block diagram of an example wireless local area network (WLAN), according to an embodiment.

In embodiments described below, a wireless network device such as an access point (AP) of a wireless local area network (WLAN) communicates with one or more client stations. The AP is configured to operate with client stations according to at least a first communication protocol. The first communication protocol is sometimes referred to herein as "high efficiency WiFi," "high efficiency WLAN," "HEW" communication protocol, or IEEE 802.11ax Standard. The first communication protocol supports OFDMA communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11g, IEEE 802.11n, and/or IEEE 802.11ac) are collectively referred herein as "legacy" communication protocols. The legacy communication protocols do not support OFDMA communication, in an embodiment.

In an embodiment, the AP 14 or the client station receives a physical layer (PHY) data that includes multiple media access control (MAC) data units aggregated in an aggregate MAC data unit. The AP or the client station that receives the PHY data unit transmits an acknowledgement data unit to acknowledge successful or unsuccessful receipt of each of the multiple MAC data units aggregated in the aggregate MAC data unit, in an embodiment. In an embodiment, the acknowledgement data unit includes an acknowledgement field of a variable length, where a particular length is determined by a maximum number of MAC data units that can be aggregated in a single aggregate MAC data unit included in the PHY data unit, in an embodiment.

In some embodiments, the AP concurrently (e.g., simultaneously) transmits independent data streams to multiple client stations and/or receives independent data streams concurrently (e.g., simultaneously) transmitted by multiple client stations. For example, the AP transmits aggregate MAC data units for the multiple clients in different orthogonal frequency division multiplexing (OFDM) sub-channels of a downlink orthogonal frequency division multiple access (OFDMA) transmission, in an embodiment. Similarly, multiple client stations transmit aggregate MAC data units to the AP concurrently (e.g., simultaneously), in particular, each client station transmits its aggregate MAC data unit in a different OFDM sub-channel of an uplink OFDMA transmission, in an embodiment. Additionally or alternatively, the AP transmits aggregate MAC data units for respective client stations using different spatial streams of a downlink multi-user multiple input multiple output (MU-MIMO) transmission. Similarly, respective client stations transmit aggregate MAC data units to the AP concurrently (e.g., simultaneously) using different spatial streams within an uplink MU-MIMO transmission to the AP, in an embodiment.

In an embodiment, upon receiving simultaneous transmissions from multiple client stations, the AP acknowledges receipt of the simultaneous transmissions by transmitting one or more acknowledgement data units to the client stations. For example, in an embodiment, the AP transmits an OFDMA acknowledgement data unit that includes respective acknowledgements intended for different client stations in different OFDM sub-channels. In another embodiment, the AP transmits an MU-MIMO acknowledgment data unit that includes respective acknowledgements intended for different client stations transmitted in different spatial streams. In yet another embodiment, the AP transmits a broadcast acknowledgement data unit that is broadcast to the multiple client stations and includes the respective acknowledgements intended for the multiple client stations, or a multicast acknowledgement data unit that is multicast to the multiple client stations and includes the respective acknowledgements intended for the multiple client stations. In an embodiment, the acknowledgment data unit includes respective variable length acknowledgement fields corresponding to respective ones of the client stations, and respective indications that indicate the respective acknowledgement field lengths. In this embodiment, respective lengths of the acknowledgment fields can be advantageously selected based on respective maximum numbers of MAC data units that can be aggregated in a single aggregate MAC data unit from the corresponding client stations. The AP acknowledges receipt of simultaneous transmissions from multiple client stations in other suitable manners, in other embodiments.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a MAC processor 18 and a PHY processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In some embodiments, the MAC processor 18 and the PHY processor 20 are additionally configured to generate data units conforming to the second communication protocol, the third communication protocol, and/or the fourth communication protocol. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In some embodiments, the MAC processor 28 and the PHY processor 29 are additionally configured to generate data units conforming to the second communication protocol, the third communication protocol, and/or the fourth communication protocol. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2A:
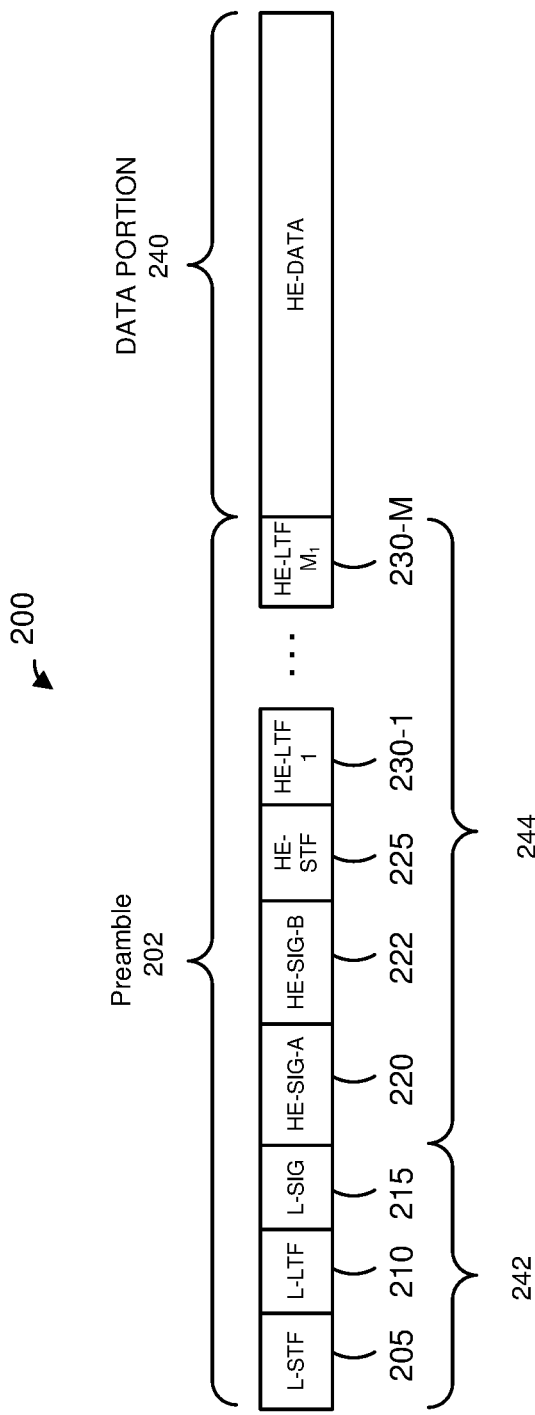
FIG. 2A is a block diagram of an example data unit, according to an embodiment.

FIG. 2A is a block diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 25-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. In an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." In an embodiment, a basic resource unit includes K OFDM tones, wherein K is an integer greater than zero, and each allocated resource unit is comprised of one or more K-OFDM tone basic resource units. In an embodiment, K=26. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

Figure 2B:
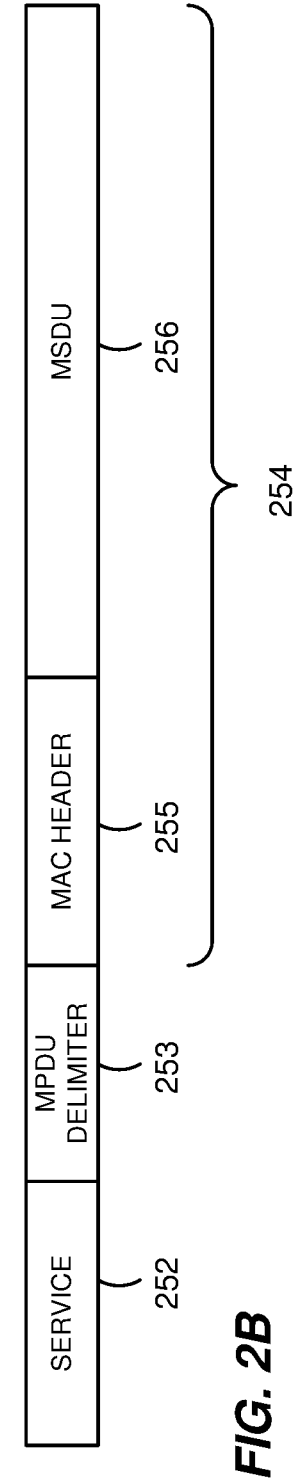
FIG. 2B is a diagram of an example data portion of the data unit data unit of FIG. 2A, according to an embodiment.

The data unit 200 includes a preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the preamble 202. The HE-SIG-A 220, the HE-SIG-B 222, the HE-STF 225 and the M HE-LTFs 230 comprise an HE preamble portion 244 of the preamble 202. In some embodiments and/or scenarios, the data unit 200 also includes a data portion 240. Referring briefly to FIG. 2B, in an embodiment, the data portion 240 includes a service field 252, and a MAC protocol data unit (MPDU) delimiter 253 followed by an MPDU 254. The MPDU 254 includes a MAC header 255 and a MAC service data unit (MSDU) 256. In some embodiments, the data portion 240 includes an aggregation MPDU (A-MPDU) which includes multiple MPDU delimiter fields 253, each MPDU delimiter field 253 optionally followed by a respective MPDU 254. In some embodiments, each of one or more of the MSDUs 256 included in the data portion 240 is an aggregation MSDU (A-MSDU) that aggregates multiple MSDUs. In an embodiment, the first communication protocol defines a maximum number of MPDUs and, accordingly, a maximum number of MSDUs/A-MSDUs, that can be aggregated in a single A-MPDU. In an embodiment, the first communication protocol specifies that a maximum of 256 MPDUs can be aggregated in a single A-MPDU. In another embodiment, the first communication protocol specifies another suitable maximum number of MPDUs that can be aggregated in a single A-MPDU.

In some embodiments, the data portion 240 additionally includes one or more padding portions (not illustrated), each of the one or more padding portions having one or more padding bits. For example, a respective padding portion is included with (e.g., appended to) each of the one or more MSDUs 256 in the data portion 240 to ensure that each MSDU 256 includes an integer number of octets of bits indicated by a length indication in the MPDU delimiter 253 that immediately precedes the MSDU 256.

Referring back to FIG. 2A, each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, the HE-SIG-A 220 comprises two OFDM symbols, and the HE-SIG-B 222 comprises one OFDM symbol. As merely another example, the HE-SIG-A 220 comprises one OFDM symbol, and the HE-SIG-B comprises two OFDM symbols. As yet another example, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2A, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes information needed to decode the data portion 240, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

In some embodiments, each of one or more of the fields 205-235 is repeated one or more times in the time domain. For example, the HE-SIGA field 220 is repeated one or more times in the time domain to increase transmission robustness and reliability of the HE-SIGA field 220. With continued reference to FIG. 2A, in some embodiments, the preamble 202 omits one or more of the fields 205-235. For example, the preamble 202 omits the HE-SIG-A 220 and/or the HE-SIG-B 222. In some embodiments, the preamble 202 includes additional fields not illustrated in FIG. 2A.

Figure 3C:
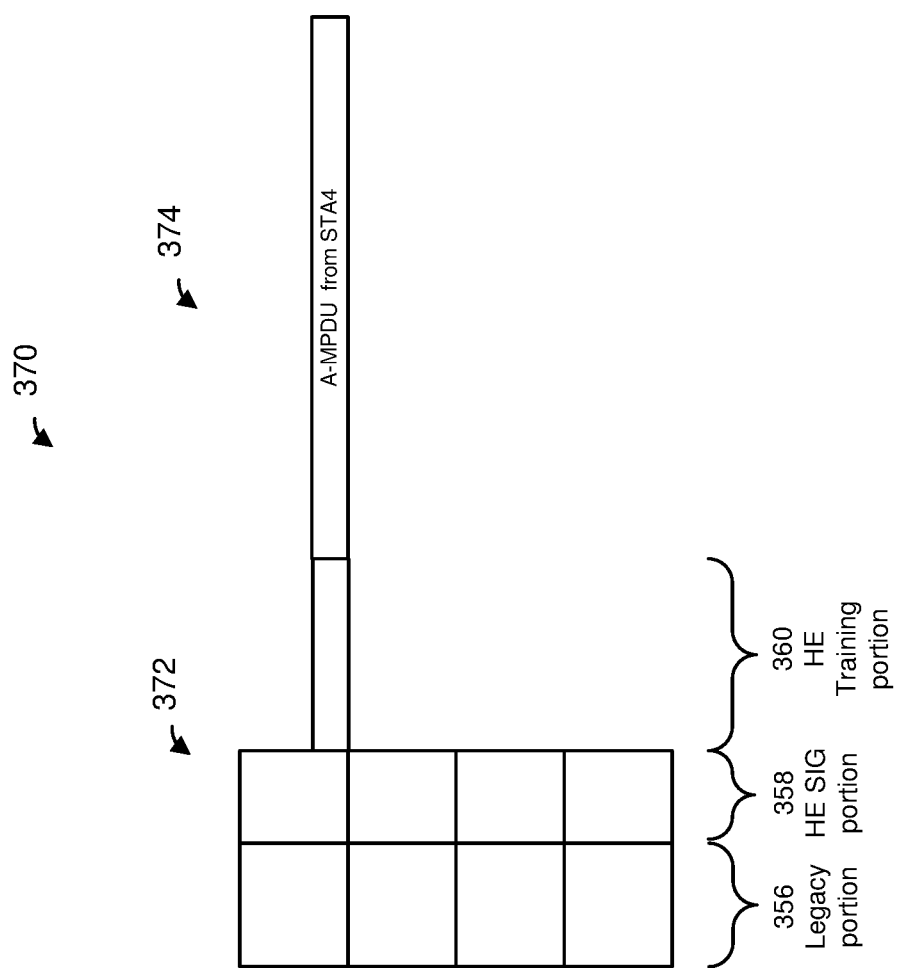

FIGS. 3A-3C are block diagrams of example PHY data units that occupy an 80 MHz bandwidth, according to embodiments. Referring first to FIG. 3A, a data unit 300 is generally similar to the data unit 200 of FIG. 2A. The data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802.11ac Standard, for example. In another embodiment, the preamble 302 corresponds to a non-legacy preamble that conforms to the IEEE 802.11ax Standard, for example. For example, in an embodiment, the preamble portion 302 includes a preamble such as the preamble 202 of FIG. 2A. At least some fields in the preamble portion 302 are duplicated in each 20 MHz bandwidth of the data unit 300. For example, the preamble portion 302 includes some or all of an L-STF field, an L-LTF field, an L-SIG field, an HE-SIG-A field, an HE-SIG-B field, an HE-STF field and HE-LTF fields such as the L-STF field 205, the L-LTF field 210, the L-SIG field 215, the HE-SIG-A field 220, the HE-SIG-B 222, the HE-STF 225, and HE-LTFs 230, respectively, and each of the L-STF field, the L-LTF field, the L-SIG field and the HE-SIG-A field, the HE-SIG-B field, the HE-STF field, and the HE-LTF fields is duplicated in each 20 MHz bands of the data unit 300. In an embodiment, at least some fields in the preamble portion 302 are different in different 20 MHz bands of the data unit 300. For example, at least a portion of an HE-SIG-B field, such as the HE- SIG-B field 222, is different (e.g., includes information) in different 20 MHz bands of the data unit 300, in an embodiment.

The data portion 304 of the data unit 300 is duplicated in each 20 MHz band of the data unit 300, in an embodiment, e.g. when the preamble portion 302 is a legacy preamble and is and duplicated in each 20 MHz band. In an embodiment, the data portion 304 includes a trigger data unit that triggers uplink OFDMA transmission by a plurality of client stations 25. In an embodiment, the trigger data unit includes information that indicates allocation of subchannels to be used for uplink OFDMA transmission, in an embodiment. The trigger data unit further indicates other transmission parameters to the multiple client stations 25, such as which modulation and coding scheme (MCS) each of the multiple client stations 25 should use, the OFDM numerology (e.g., guard interval, tone spacing, etc.) that each of the multiple client stations should use, transmit power that each of the multiple client stations 25 should use, etc. In an embodiment, the trigger data unit is a duplicate broadcast data unit transmitted to the multiple client stations 25 in each 20 MHz band of a legacy PHY data unit that generally conforms to a legacy communication protocol (e.g., IEEE 802.11a, IEEE 802.11n, IEEE 802.11ac communication protocol). In another embodiment, the trigger data unit is a broadcast data unit that occupies the entire 80 MHz bandwidth of a non-legacy PHY data unit that conforms to the first communication protocol (e.g., HE communication protocol). In yet another embodiment, the trigger data unit is aggregated with data in a downlink A-MPDU in each subchannel or each resource unit of the downlink A-MPDU.

Referring now to FIG. 3B, a data unit 350 is generally similar to the data unit 200 of FIG. 2A, in an embodiment. The data unit 350 includes a preamble portion 352 and a data portion 354. The preamble portion 352 includes a legacy portion 356, an HE signal field portion 358 and an HE training field portion 360. The legacy portion 356 includes an L-STF field, an L-LTF field and an L-SIG field such as the L-STF field 205, the L-LTF field 210, the L-SIG field 215, respectively, in an embodiment. The HE signal field portion 358 includes one or more HE signal fields such as the HE-SIG-A 220 and/or the HE-SIG-B 222, in an embodiment. The HE signal field portion 358 omits the HE-SIG-B 222, in some situations, in an embodiment. For example, the HE signal field portion 358 omits the HE-SIG-B 222 when the data unit 300 is an uplink data unit, in an embodiment. The HE training field portion 358 includes HE training fields such as the HE-STF 225 and the HE-LTFs 230, in an embodiment.

In an embodiment, the data portion 354 of the data unit 350 includes a plurality of aggregated MAC protocol data units (A-MPDU) respectively directed to ones of multiple client stations 25, where each A-MPDUs includes one or more MPDUs, with each of the one or more MPDUs including one or more MAC service data units (MSDUs). In an embodiment, at least some of the A-MPDUs in the data portion 354 occupy subchannels that span a width of less than 20 MHz. For example, A-MPDU to (or from) STA3 and A-MPDU to (or from) STA4 each occupies a subchannel that spans a width of less than 20 MHz, in an embodiment. In an embodiment, the legacy portion 356 and the HE SIG portion 358 of the preamble 352 spans multiple data units that collectively occupy a 20 MHz bandwidth. On the other hand, the HE training portion 360 of the preamble 352 includes respective training field portions that occupy respective ones of the multiple subchannels in the 20 MHz bandwidths, in an embodiment.

In another embodiment, at least some of the A-MPDUs in the data portion 354 occupy subchannels that span a width of more than 20 MHz. As just an example, an A-MPDU in the data portion 354 occupies a subchannel that spans 40 MHz, in an embodiment. For example A-MPDU to (or from) STA2 in FIG. 3B spans a 40 MHz bandwidth, in an embodiment. In an embodiment, the legacy portion 356 and the HE SIG portion 358 of the preamble 352 is duplicated in each 20 MHz band of the 40 MHz bandwidth. On the other hand, the HE training portion 360 of the preamble 352 spans the entire 40 MHz bandwidth, in an embodiment.

The data unit 350 is a downlink OFDMA data unit transmitted by the AP to a plurality of client stations 25, in an embodiment. In another embodiment, respective A-MPDUs in the data portion 354 are transmitted by multiple client stations 25 as parts of an OFDMA transmission by multiple client stations 25. In an embodiment, an uplink data unit transmitted by a client station 25 includes the legacy preamble portion 354 and the HE signal field portion 356. Additionally, the uplink data unit transmitted by the client station 25 includes a portion of the HE training field portion 260 corresponding to the subchannel allocated for the uplink transmission by the client station 25. Referring briefly to FIG. 3C, an uplink data unit 370 is transmitted by STA4, in an embodiment. The uplink data unit 370 includes a preamble 372. The data unit 370 further includes a data portion 374. The data portion 374 includes a data unit (e.g., an A-MPDU) in the subchannel allocated to STA3, in an embodiment. In an embodiment, the preamble 372 includes the legacy portion 356 and the HE signal portion 358, in an embodiment. The preamble 372 additionally includes a portion of the HE training portion 360 that corresponds to the subchannel allocated to STA4. In the embodiment of FIG. 3C, the legacy portion 356 and the HE signal portion 358 is each repeated in multiple 20 MHz subbands of the bandwidth of the uplink data unit 370. In another embodiment, the legacy portion 356 and the HE signal portion 358 each occupies only one or more 20 MHz subbands of the data unit 370 that include the data portion 274. Thus, for example, the legacy portion 356 and the HE signal portion 358 each only the first 20 MHz subband that includes the A-MPDU from STA4, in an embodiment. Similarly, in an embodiment, the HE training portion 360 occupies one or more 20 MHz subbands of the data unit 370 that include the data portion 274. Thus, for example, the HE training portion 360 occupies the entire first 20 MHz subband of the data unit 370 that includes the A-MPDU from STA4, in an embodiment.

Figure 4:
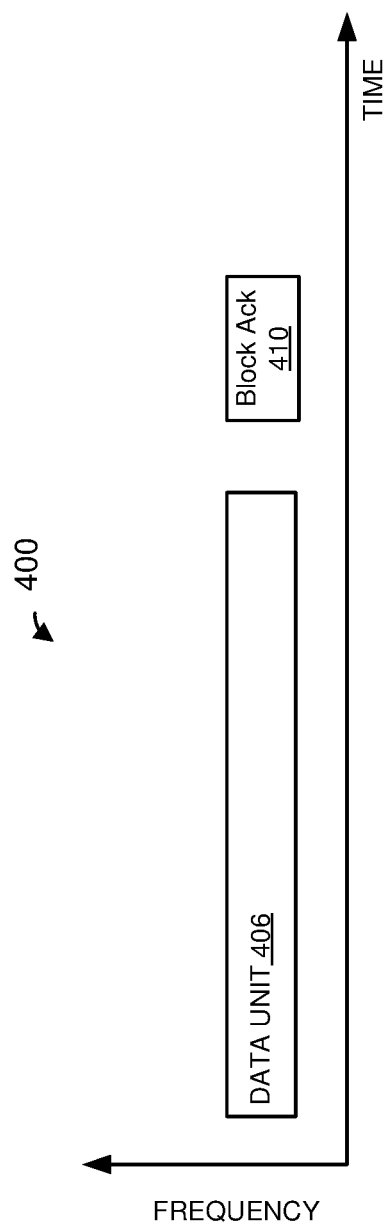
FIG. 4 is a block diagram of another example transmission sequence in a WLAN, according to another embodiment.

FIG. 4 is a block diagram of an example transmission sequence 400 in a WLAN such as the WLAN 10, according to an embodiment. The transmission sequence 400 includes transmission of a data unit 406. The data unit 406 is a single user data unit that includes data corresponding to a single client station 25, in an embodiment. In another embodiment, the data unit 406 is a multi-user data unit that includes respective data corresponding to multiple client stations 25. For example, the data unit 406 is an MU-MIMO and/or OFDMA data unit that includes respective data transmitted to respective client stations 25 or by respective client stations 25 in respective frequency portions and/or respective spatial streams allocated to the client stations 25. In an embodiment, the data unit 406 is a downlink data unit transmitted by the AP 14 to one or more client stations 25. In another embodiment, the data unit 406 is an uplink data unit that includes one or more data units simultaneously transmitted by one or more client stations 25 to the AP 14. In an embodiment in which the data unit 406 is an uplink data unit that includes one or more uplink data units simultaneously transmitted by one or more client stations 25, transmission of the one or more data units is triggered by a trigger data unit (not shown in FIG. 4) transmitted by the AP 14 to the one or more client stations 25 to trigger transmission of the one or more data units by the one or more client stations 25. In an embodiment, the data unit 406 corresponds to the data unit 200 of FIG. 2A. In another embodiment, the data unit 406 corresponds to the data unit 300 of FIG. 3A or the data unit 350 of FIG. 3B. In another embodiment, the data unit 406 is a suitable data unit different from the data unit 200 of FIG. 2A, the data unit 300 of FIG. 3A and the data unit 350 of FIG. 3B.

Upon receiving the data unit 406, a receiving device transmits an acknowledgement data unit 410 to acknowledge receipt of data in the data unit 406. Thus, for example, in an embodiment in which the data unit 406 is a single user downlink data unit transmitted by the AP 14 to a client station 25 (e.g., the client station 25-1), the acknowledgement data unit 410 is transmitted by the client station 25-1 to the AP 14 to acknowledge receipt of the data unit 406 by the client station 25-1. As another example, in an embodiment in which the data unit 406 a multi user downlink data unit transmitted by the AP 14 to multiple client stations 25, the acknowledgement data unit 410 includes respective acknowledgement data units transmitted by the multiple client stations 25. As yet another example, in an embodiment in which the data unit 406 is a single user uplink data unit transmitted by the client station 25-1 to the AP 14, the acknowledgement data unit 410 is transmitted by the AP 14 to the client station 25-1. As still another example, in an embodiment in which the data unit 406 is a multi-user uplink data unit that includes respective data units transmitted by multiple client stations 25, the acknowledgement data unit 410 is transmitted by the AP 14 to the multiple client stations 25 and includes respective acknowledgement data corresponding to respective ones of the multiple client stations 25.

In an embodiment, the data unit 406 is an A-MPDU that aggregates multiple MPDUs (each having one or more MSDUs), and the acknowledgement data unit 410 is a block acknowledgement (Block Ack) data unit that includes respective acknowledgement information for respective ones of the multiple MPDUs aggregated in the A-MPDU. Accordingly, the data unit 406 is sometimes referred to herein as A-MPDU 406, and the acknowledgement data unit 410 is sometimes referred to herein as a Block Ack 410. In an embodiment, the Block Ack 410 is of variable length. The particular length of the Block Ack 410 is determined by a maximum number of MPDUs that potentially need to be acknowledged by the Block Ack 410. As discussed above with respect to FIG. 2B, in an embodiment, the first communication protocol defines a maximum number (e.g., 256 or another suitable maximum number) of MPDUs that can be aggregated into a single A-MPDU. However, in some situations, a number of MPDUs that can potentially be aggregated in the A-MPDU 406 is less than the maximum number of MPDUs defined for a single A-MPDU by the first communication protocol. For example, a device that transmits the A-MPDU 406 may have an insufficient amount of buffer memory to buffer block acknowledgement information expected to be received from the device that receives and acknowledges the A-MPDU 406 if the supported maximum number of MPDUs were aggregated into the A-MPDU 406. Thus, the maximum number of MPDUs that can be aggregated in the A-MPDU 406 is less than the maximum supported number of MPDUs, in an embodiment.

In an embodiment, the Block Ack 410 includes a bitmap in which respective bits indicate successful or unsuccessful receipt of respective ones of the multiple MPDUs aggregated in the A-MPDU 406. In an embodiment, in at least some scenarios, the maximum number of MPDUs that can be included in a single A-MPDU transmitted from the AP 14 to a particular client station 25 (or vise-versa) may be less than a maximum number of MPDUs in a single A-MPDU supported by the first communication protocol. For example, in an embodiment, the maximum number of MPDUs that can be included in a single A-MPDU transmitted from the AP 14 to a particular client station 25 (or vise-versa) is negotiated between the AP 14 and the client station 25. Then, in the case that the negotiated maximum number of MPDUs in less than the supported maximum number of MPDUs, acknowledgement data units from the client station 25 to the AP 14 (or vice versa) include relatively shorter bitmaps to acknowledge the negotiated number of MPDUs, in at least some situations, in an embodiment. As just an example, in an embodiment in which the first communication protocol supports aggregation of a maximum of 256 MDPUs in a single A-MPDU, but the data unit 406 can include a maximum number of MPDUs that is less than 256 MPDUs (e.g., 128 MPDUs, 64 MPDUs, 32 MPDUs, or another suitable maximum number of MDPUs less than 256 MPDUs), the bitmap included in the block acknowledgement 410 includes a number of bits that is less than 256 bits corresponding to the maximum number of MPDUs that can be included in the data unit 406. In an embodiment, the length of the bitmap in the acknowledgement data unit 410 is selected from a plurality of predetermined possible lengths of the bitmap. For example, the length of the bitmap is selected from a plurality of possible numbers of bits included in the bitmap, wherein the possible numbers of bits are 256 bits, 128 bits, 64 bits, 32 bits.

In an embodiment, a length of the bitmap included in the block acknowledgement 410 is determined by the particular number of MPDUs that are included in the A-MPDU 406 being acknowledged by the block acknowledgement 410. For example, in an embodiment in which a number of bits of the bitmap in the acknowledgement data unit 410 is selected from a plurality of possible numbers of bits (e.g., 256 bits, 128 bits, 64 bits, 32 bits), the number of bits is selected such that the number of bits is the smallest number of bits, of the plurality of possible numbers of bits, that is greater than or equal to the particular number of MPDUs included in the A-MPDU 406 being acknowledged by the acknowledgement data unit 410.

In an embodiment, negotiation between devices (e.g., between the AP 14 and a client station 25) occurs during a block acknowledgement setup procedure, such as an ADDBA negotiation procedure, between two devices and prior to transmission of data between the devices. In an embodiment, a maximum number of MPDUs that can be aggregated into a single A-MPDU is limited by a buffer size, or the number of buffers available and/or allocated for receiving block acknowledgements, at a receiving device. In an embodiment, therefore, a negotiated buffer size determines a number of MPDUs for each of a plurality traffic classes that can be aggregated into a single A-MPDU. For example, in an embodiment in which a negotiated buffer size allows for 256 MPDUs to be aggregated into a single A-MPDU and the first communication protocol supports 8 traffic classes, the transmitting device may include a maximum of 256 MPDUs for each of 8 classes. Accordingly, a single A-MPDU can include a maximum of 256*8=2048 MPDUs, in this embodiment. In another embodiment, a negotiated buffer size determines a maximum number of MPDUs that can be aggregated into a single A-MPDU regardless of the traffic classes of MPDUs. Thus, for example, in an embodiment in which a negotiated buffer size allows for 256 MPDUs to be aggregated into a single A-MPDU and the first communication protocol supports 8 traffic classes, the transmitting device may include a maximum of 256 MPDUs across all 8 classes, in an embodiment. In yet another embodiment, a first buffer size is negotiated for single TID data units and a second buffer size is negotiated for multi-TID data units.

In an embodiment, a maximum A-MPDU length is announced by a receiving device (e.g., the AP 14 or a client station 25). For example, in an embodiment, the AP 14 and/or the client station 25 transmits a management data unit, such as a beacon data unit (also referred to herein as "a beacon frame"), an association request data unit, a re-association request data unit, an association response data unit, a re-association response data unit, a probe request data unit, a probe response data unit, or another suitable data unit, wherein the management data unit includes an indication of a maximum length A-MPDU supported by the device. For example, a maximum A-MPDU length exponent field is included in the management data unit. The maximum A-MPDU length exponent field is included in a first capabilities element included in the management data unit, wherein the first capabilities element is defined by a legacy communication protocol, in an embodiment. For example, the first capabilities element is a VHT capabilities element defined by the IEEE 802.11ac Standard or the HT capabilities element defied by the IEEE 802.11n Standard, in various embodiments. The value of the A-MPDU length exponent field is used at a transmitting device to determine a maximum A-MPDU length supported by the receiving device. In an embodiment, the maximum A-MPDU length supported by the receiving device is determined by $2^{13+Maximum\ A\text{-}MPDU\ length\ exponent}-1$, where Maximum A-MPDU length exponent is the value of the A-MPDU length exponent field in the first capabilities element. In an embodiment, the Maximum A-MPDU length field in the first capabilities element comprises three bits, and the value Maximum A-MPDU length exponent field in the first capabilities element is in the range of 0 to 7. Accordingly, the value Maximum A-MPDU length exponent field in the first capabilities element specifies a maximum A-MPDU length of up to $2^{20}$ bytes (i.e., up to 1,048,576 bytes). In other embodiments, the Maximum A-MPDU length field in the first capabilities element comprises fewer than or greater than three bits and/or the value Maximum A-MPDU length exponent in the first capabilities element specifies a maximum A-MPDU length of other than up to $2^{20}$ bytes.

In an embodiment, in order to specify a maximum A-MPDU length greater than the maximum value that can be specified by the Maximum A-MPDU length exponent field in the first capabilities element (e.g., greater than $2^{20}$ bytes), the receiving device transmits an additional A-MPDU maximum exponent field, for example by including the additional A-MPDU maximum exponent field in a second capabilities element of a management frame. In an embodiment, the second capabilities element is an HE capabilities element defined by the first communication protocol. In an embodiment, the maximum A-MPDU length exponent field in the second capabilities element comprises three bits. In another embodiment, the maximum A-MPDU length exponent field in the second capabilities element comprises fewer than or greater than three bits. In an embodiment, the maximum A-MPDU length exponent field in the second capabilities element is set to identify one of multiple predetermined exponents, such as an exponent from among 20, 21 and 22. In an embodiment in which the maximum A-MPDU length exponent field in the second capabilities element comprises three bits and the field is used to indicate one of three predetermined exponent values, three values of the three bits (e.g., 0, 1 and 2) are respectively defined to indicate the three predetermined exponent values and the remaining values (e.g., 3-7) of the three bits are reserved. In an embodiment, the particular exponent indicated in the A-MPDU length exponent field in the second capabilities element signifies that the maximum A-MPDU length supported by the device is $2^{20+Maximum\ A\text{-}MPDU\ length\ exponent}-1$, where Maximum A-MPDU length exponent is the value of the A-MPDU length exponent field in the second capabilities element.

In an embodiment, the A-MPDU maximum length exponent field in the second capabilities element is used by the transmitting device in combination with A-MPDU maximum length exponent field in the first capabilities element to determine the maximum A-MPDU length supported by the receiving device. For example, if the value of the A-MPDU maximum length exponent field in the first capabilities element is less than 7, then the transmitting device determines the maximum A-MPDU length supported by the receiving device according to $2^{13+Maximum\ A\text{-}MPDU\ length\ exponent}-1$, where Maximum A-MPDU length exponent is the value of the A-MPDU length exponent field in the first capabilities element. In this case, the A-MPDU length exponent field in the second capabilities element is reserved, in an embodiment. On the other hand, if the value of the A-MPDU maximum length exponent field in the first capabilities element is equal to 7, then the transmitting device determines the maximum A-MPDU length supported by the receiving device according to $2^{20+Maximum\ A\text{-}MPDU\ length\ exponent}-1$, where Maximum A-MPDU length exponent is the value of the A-MPDU length exponent field in the second capabilities element.

Figure 5:
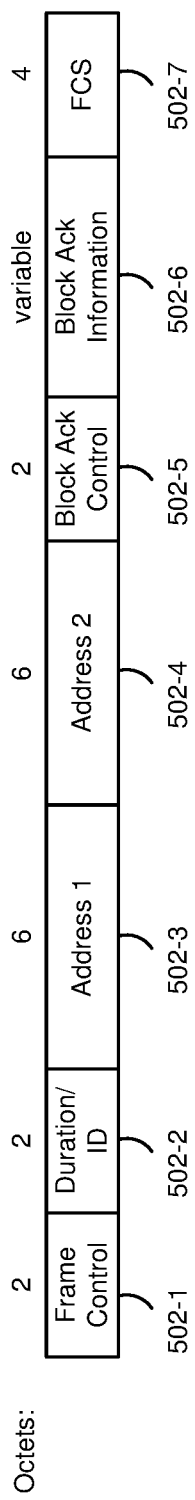
FIG. 5 is a block diagram of an example acknowledgement data unit, according to an embodiment.

FIG. 5 is a block diagram of an example acknowledgement data unit 500 included in an acknowledgement data unit, according to an embodiment. In an embodiment, the acknowledgement data unit 500 is included in the acknowledgement data unit 410 of FIG. 4. In another embodiment, the acknowledgement data unit 500 is included in a suitable data unit different from the acknowledgement data unit 410 of FIG. 4. Similarly, the acknowledgement data unit 410 of FIG. 4 includes an acknowledgement data unit different from the acknowledgement data unit 500, in some embodiments. The acknowledgement data unit 500 includes a plurality of fields 502. In the embodiment illustrated in FIG. 5, the fields 502 include a data unit control field 502-1, a duration/id field 502-2, a first address (e.g., receiver address) field 502-3, a second address (e.g., transmitter address) field 502-4, a Block Ack control field 502-5, a Block Ack information field 502-6, and a data unit sequence check (FCS) field 502-7. The number indicated in FIG. 5 above each of the fields 502 indicates the number of octets of bits in the corresponding field 502, according to an example embodiment.

The first address (address 1) field 502-3 includes an address of an intended receiver of the acknowledgement data unit that includes the control field 500, in an embodiment. In an embodiment and/or scenario in which the control field 500 is included in a unicast acknowledgement data unit directed to only one client station 25, the first address field 502-3 includes a unicast address, such as a unicast MAC address, corresponding to the one client station 25. On the other hand, in an embodiment and/or scenario in which the control field 500 is included in a broadcast acknowledgement data unit directed to multiple client stations 25, the first address field 502-3 includes a broadcast address, such as a broadcast MAC address, to indicate that the acknowledgement data unit is directed to multiple client stations 25.

Figure 6:
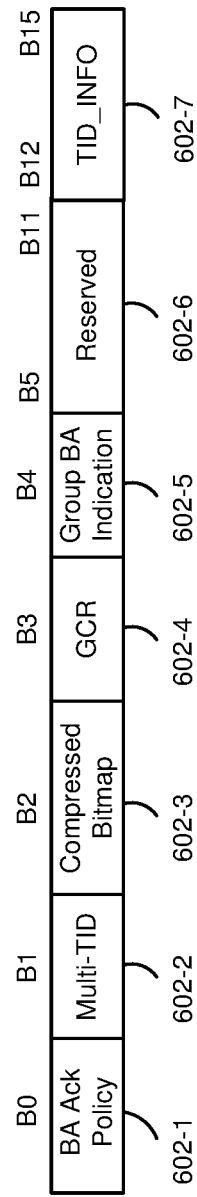
FIG. 6 is a block diagram of an example control field of an acknowledgement data unit, according to an embodiment.

FIG. 6 is a block diagram illustrating bit allocation of a Block Ack control field 600 included in an acknowledgement data unit, according to an embodiment. The Block Ack control field 600 corresponds to the Block Ack control field 502-5, in an embodiment. The Block Ack control field 600 includes a plurality of subfields 602. The subfields 602 collectively comprise 16 bits, in the illustrated embodiment. The subfields 602 collectively comprise a suitable number of bits different than 16 bits, in other embodiments. In the embodiment illustrated in FIG. 6, the Block Ack control field 600 includes a BA Ack policy subfield 602-1, a multi-TID subfield 602-2, a compressed bitmap subfield 602-3, a GroupCast with Retries (GCR) subfield 602-4, a group BA indication subfield 602-5, a reserved subfield 602-6, and a TID information subfield 602-7. Bit allocation for each of the subfields 602, according to an example embodiment, is illustrated in FIG. 6 above the corresponding subfields 602.

In an embodiment, the group BA indication subfield 602-5 indicates whether the acknowledgement data unit that includes the BA control field 600 includes a single acknowledgement to acknowledge a single data unit received from one client station 25 or includes multiple acknowledgements to acknowledge multiple data units received from multiple client stations 25, for example as parts of an MU-MIMO uplink transmission from the multiple client stations 25 or an OFDMA transmission from the multiple client stations 25. In an embodiment, the group BA indication field 602-5 serves as an additional indication to indicate whether the acknowledgement data unit that includes the BA control field 600 includes a single acknowledgement directed to one client station 25 or multiple acknowledgements directed to multiple client stations 25, in addition to the indication provided by the RA field 502-3 as discussed above with respect to FIG. 5. In another embodiment, the group BA indication subfield 602-5 is omitted from the BA control field 600, and the RA field 502-3 is instead relied upon to indicate whether the acknowledgement data unit that includes the BA control field 600 includes a single acknowledgement directed to one client station 25 or multiple acknowledgements directed to multiple client stations 25.

Figure 7:
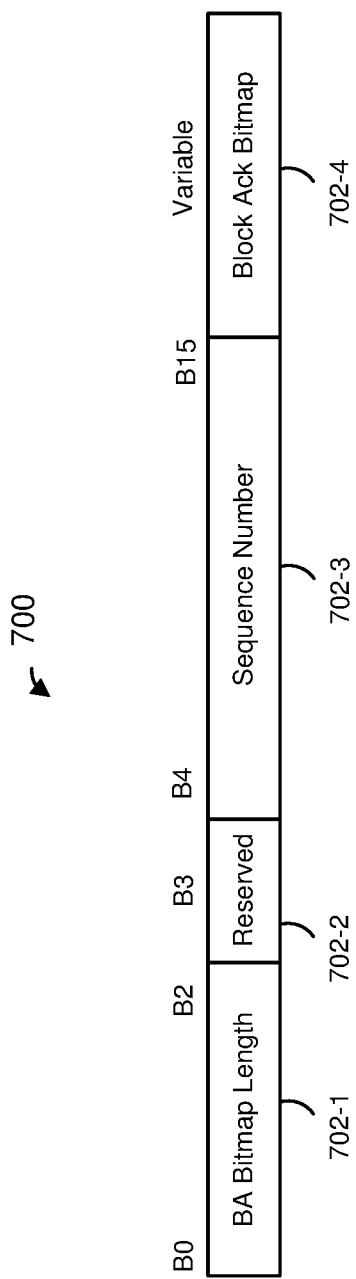
FIG. 7 is a block diagram of an example information element included in an acknowledgement data unit, according to an embodiment.

FIG. 7 is a block diagram of a Block Ack information field 700, according to an embodiment. In an embodiment, the Block Ack field 700 corresponds to the Block Ack information field 502-6 of the acknowledgement data unit 500 of FIG. 5. The block acknowledgement information field 700 includes a plurality of subfield 702. In the embodiment illustrated in FIG. 7, the subfields 702 include a Block Ack Bitmap Length subfield 702-1, a reserved subfield 702-2, a sequence number subfield 702-3, and a Block Ack bitmap subfield 702-4. The Block Ack Bitmap Length subfield 702-1, the reserved subfield 702-2 and the sequence number subfield 702-3 collectively correspond to a Block Ack starting sequence control field of the Block Ack information field 700, in an embodiment. The sequence number subfield 702-3 indicates a sequence number corresponding to the first one of the data units being acknowledged, and each bit of the Block Ack bitmap subfield 702-4 acknowledges a data unit with a sequence number that equals the sequence number indicated by the sequence number subfield 702-3 plus the index of the bit, in an embodiment. Thus, for example, the first bit (bit index 0) of the Ack bitmap subfield 702-4 acknowledges the data unit with the sequence number indicated by the sequence number subfield 702-3, the second bit (bit index 1) of the Block Ack bitmap subfield 702-4 acknowledges the data unit with a sequence number indicated by the sequence number subfield 702-3 plus 1, etc., in an embodiment. In an embodiment, the value of each bit of Block Ack bitmap subfield 702-4 indicates whether the corresponding data unit was successfully received. For example, a value of logic one (1) of a bit of Block Ack bitmap subfield 702-4 indicates that the corresponding data unit was successfully received, and a value of logic zero (0) of a bit of Block Ack bitmap subfield 702-4 indicates that the corresponding data unit was not successfully received (e.g., not received or received with an error).

In an embodiment, the Block Ack bitmap subfield 702-4 is of variable length. In an embodiment, the length of the Block Ack bitmap subfield 702-4 depends on a maximum length of the A-MPDU being acknowledged by the Block Ack information field 700. For example, in an embodiment, the Block Ack bitmap subfield 702-4 includes a number of bits corresponding to a maximum number of MPDUs that can be included in the A-MPDU being acknowledged by the Block Ack information field 700. The Block Ack Bitmap Length subfield 702-1 indicates the length of the Block Ack bitmap subfield 702-4. In an embodiment, at least a portion of a fragment number field of the Block Ack information field 700 is redefined from indicating a fragment number to indicating the length of the Block Ack bitmap subfield 702-4. For example, in an embodiment, the Block Ack Bitmap Length subfield 702-1 and the reserved subfield 702-2 collectively correspond to a fragment number field that is redefined from indicating a fragment number to indicating the length of the Block Ack bitmap subfield 702-4. In an embodiment, the Block Ack Bitmap Length subfield 702-1 includes one or more bits set to a value that indicates one length of a plurality of predetermined lengths. In an embodiment, for example, the bitmap length indication includes two bits for four values corresponding to one of four predetermined lengths of 32 octets, 16 octets, 8 octets, and 4 octets (i.e., 256 bits, 128 bits, 64 bits, and 32 bits, respectively). In other embodiments, other suitable numbers of pluralities of predetermined lengths (e.g., two different lengths, eight different lengths, etc.) and/or other values of the predetermined lengths are utilized. In an embodiment, the particular one of the predetermined lengths is selected based on the number of MPDUs that were included in the A-MPDU being acknowledged. For example, a smallest one of the predetermined lengths that is greater than or equal to the number of MPDUs that were included in the A-MPDU being acknowledged is selected. The length of the Block Ack bitmap subfield 702-4 is less than the buffer size defined during block acknowledgment negotiation (e.g., ADDBA negotiation), in some embodiments.

Figure 8:
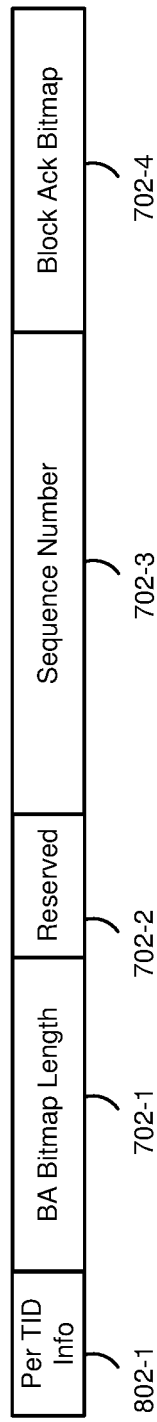
FIG. 8 is a block diagram of another example information element included in an acknowledgement data unit, according to another embodiment.

FIG. 8 is a block diagram of an example per-TID Block Ack information element 800 included in an acknowledgement data unit, according to an embodiment. In an embodiment, one or more per-TID Block Ack information elements 800 are included in an acknowledgement data unit that acknowledges an A-MPDU that includes one or more MPDUs corresponding to each of one or more traffic classes. The per-TID Block Ack information element 800 is generally the same as the Block Ack information element 700 of FIG. 7 and includes some or all of the same subfields 702 as the Block Ack information element 700 of FIG. 7. The per-TID Block Ack information element 800 additionally includes a per TID information subfield 802-1. In an embodiment, the per TID information subfield 802-1 indicates the particular traffic class to which the per-TID Block Ack information element 800 corresponds, and the Block Ack Bitmap subfield 702-4 includes a bitmap set to indicates successful or unsuccessful reception of one or more MPDUs of the particular traffic class. In an embodiment, the per TID information subfield 802-1 includes 16 bits (i.e., two bytes). In another embodiment, the per TID information subfield 802-1 includes a suitable number of bits other than 16. In an embodiment in which the per TID information subfield 902-1 includes 16 bits, fewer than 16 bits are used to indicate the particular traffic class to which the per-TID Block Ack information element 800 corresponds, and the remaining bits of the per TID information subfield 802-1 are reserved or are used for a purpose other than indicating a traffic class, in various embodiments.

Figure 9:
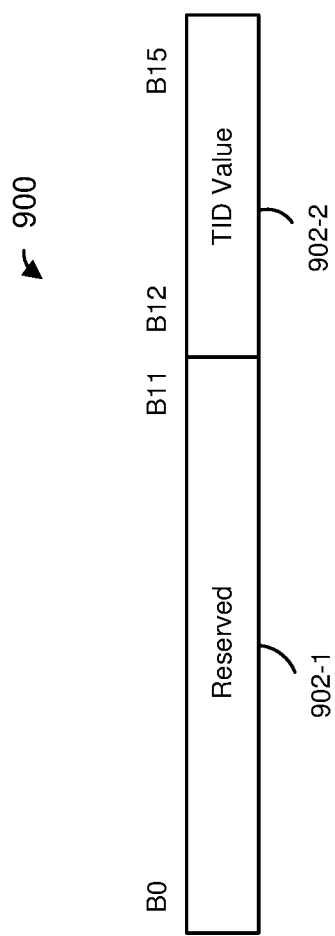
FIG. 9 is a block diagram of an example traffic class identifier information field, according to an embodiment.

FIG. 9 is a block diagram of a per-TID Block Ack information element 900 included in a single user acknowledgement data unit used to acknowledge an A-MPDU that included MPDUs received from a single device (e.g., a single client station 25), according to an embodiment. In an embodiment, the per-TID Block Ack information element 900 is included in a single user acknowledgement data unit used to acknowledge an A-MPDU of a single client station, wherein the A-MPDU can include MPDUs of multiple traffic classes. The per-TID Block Ack information element 900 corresponds to the per-TID Block Ack information element 800 of FIG. 8 in an embodiment and scenario in which the acknowledgement data unit that includes the per-TID Block Ack information element 800 is used to acknowledge data of a single client station, in an embodiment. The per-TID Block Ack information element 900 includes reserved bits 900-1 and a TID value subfield 900-2 set to a value that indicates a traffic class to which the per-TID Block Ack information element 900 corresponds, in an embodiment.

Figure 10:
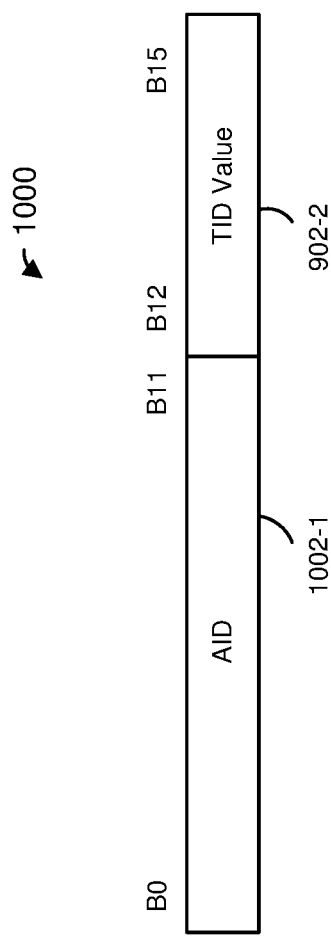
FIG. 10 is a block diagram of another example traffic class identifier information field, according to another embodiment.

FIG. 10 is a block diagram of a per-TID Block Ack information element 1000 included in a multi user acknowledgement data unit used to acknowledge respective A-MPDUs received from multiple device (e.g., a multiple ones of the client station 25), according to an embodiment. In an embodiment, the per-TID Block Ack information element 1000 is included in a multi user acknowledgement data unit used to acknowledge respective A-MPDUs of multiple client stations, wherein each A-MPDU can include MPDUs of multiple traffic classes. The per-TID Block Ack information element 1000 is generally the same as the per-TID Block Ack information element 900 of FIG. 9 except that at least some of the reserved bits 900-1 in the per-TID Block Ack information element 900 of FIG. 9 are replaced with a client station identifier field such as the association identifier (AID) field 1000-1. In an embodiment, the AID subfield 1000-1 includes an AID of the client station to which the per-TID Block Ack information element 900 corresponds. In another embodiment, the AID subfield 1000-1 includes a partial AID of the client station to which the per-TID Block Ack information element 900 corresponds. In other embodiments, the AID subfield 1000-1 includes another suitable identifier of the client station to which the per-TID Block Ack information element 900 corresponds.

Figure 11:
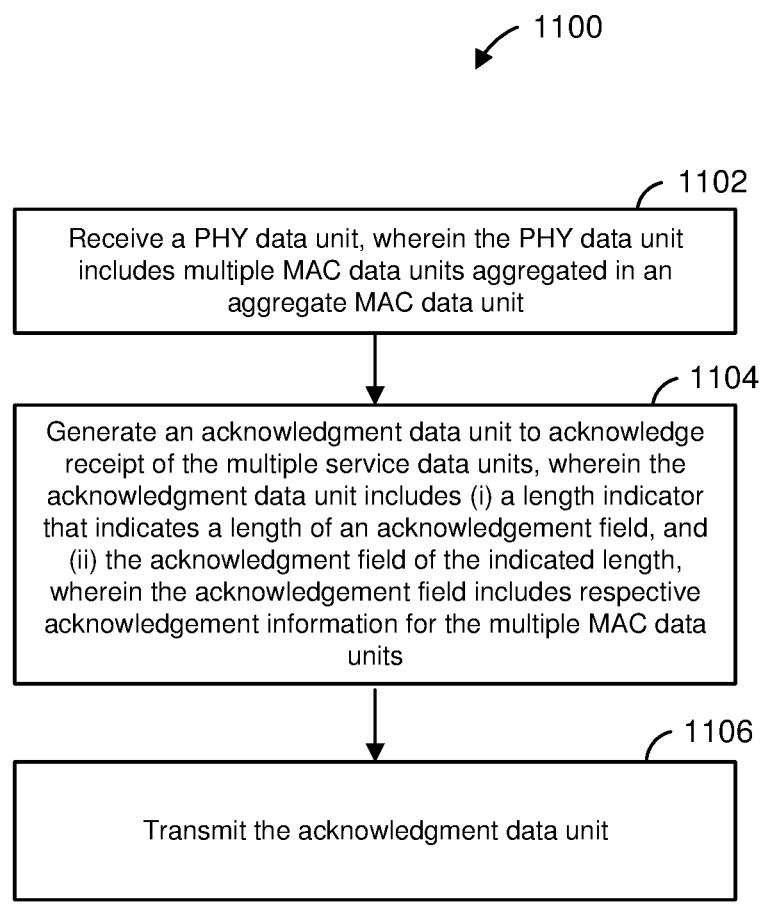
FIG. 11 is a flow diagram of an example method for acknowledging data units in a wireless local area network, according to an embodiment.

FIG. 11 is a flow diagram of an example method 1100 for acknowledging data units in a wireless local area network, the method comprising, according to an embodiment. In an embodiment, the method 1100 is implemented by a first communication device. The first communication device is an AP such as the AP 14 or a client station such as the client station 25-1, for example, in various embodiments. For example, the method 1100 is implemented by the MAC processor 18 and/or by the PHY processor 20 of the AP 14, in an embodiment. As another example, the method 1100 is implemented by the MAC processor 28 and/or by the PHY processor 29 of the client station 25-1, in another embodiment. In other embodiments, the method 1100 is implemented by other suitable communication devices.

At block 1102, a PHY data unit is received. In an embodiment, the data unit 200 of FIG. 2 is received. In another embodiment, one of the data units 300 of FIG. 3A, 350 of FIG. 3B or 370 of FIG. 3C is received. In other embodiments, other suitable PHY data units are received. The PHY data unit includes multiple MAC data units aggregated in an aggregate MAC data unit, in an embodiment. For example, the multiple MAC data units aggregated in an aggregate MAC data unit included in a data portion of the PHY data unit, in an embodiment At block 1104, an acknowledgement data unit to acknowledge receipt of the multiple MAC data units. In an embodiment, the acknowledgement data unit 500 of FIG. 5 is generated. In another embodiment, a suitable acknowledgement data unit different from the acknowledgement data unit 500 of FIG. 5 is generated. In an embodiment, the acknowledgement data unit includes an acknowledgement field of a variable length. For example, the data unit includes a bitmap of a variable length, in an embodiment. The particular length of the acknowledgement field is determined based at least in part on a maximum number of MAC data units that can be included in the PHY data unit received at block 1102, in an embodiment. In an embodiment, the acknowledgement data unit additionally includes a length indication that indicates the length of the acknowledgement field.

In some embodiments, the multiple MAC data units aggregated in the aggregate MAC data unit included in the PHY data unit received at block 1102 correspond to multiple traffic classes. The acknowledgement data unit generated at block 1104 includes, for each one of the multiple traffic classes, (i) a respective length indication that indicates a respective length of an acknowledgement field corresponding to the traffic class, and (ii) a respective acknowledgment field of the corresponding length, the wherein the respective acknowledgement field includes respective acknowledgement information for multiple MAC data units of the traffic class, in some such embodiments.

At block 1106, the acknowledgement data unit is transmitted to a communication device from which the PHY data unit was received at block 1102.

In an embodiment, a method for acknowledging a data unit includes receiving, at a first communication device from a second communication device, a physical layer (PHY) data unit, wherein the PHY data unit includes multiple medium access control (MAC) data units aggregated in an aggregate MAC data unit; generating, at the first communication device, an acknowledgment data unit to acknowledge receipt of the multiple MAC data units, wherein the acknowledgment data unit includes (i) a length indication that indicates a length of an acknowledgement field, and (ii) the acknowledgment field of the indicated length, wherein the acknowledgement field includes respective acknowledgement information for the multiple MAC data units; and transmitting the acknowledgment data unit from the first communication device to the second communication device.

In other embodiments, the method includes any suitable combination of one or more of the following features.

Generating the acknowledgment data unit includes generating the length indication to indicate one of a plurality of predetermined lengths of the acknowledgement field.

Respective predetermined lengths in the plurality of predetermined lengths correspond to respective maximum numbers of MAC data units that can be included in the aggregate MAC data unit.

Generating the length indication comprises generating the length indication based on a maximum number of MAC data units previously negotiated between the first communication device and the second communication device.

The plurality of predetermined lengths include a first length of 4 bytes corresponding to a maximum of 32 MAC data units, a second length of 8 bytes corresponding to a maximum of 64 MAC data units, a third length of 16 bytes corresponding to a maximum of 128 MAC data units, and a fourth length of 32 bytes corresponding to a maximum of 256 MAC data units.

Generating the acknowledgment data unit includes generating the acknowledgement field to include a block acknowledgment bitmap having the length indicated by the length indication, wherein each bit of the block acknowledgment bitmap indicates an acknowledgment of a respective single MAC data unit of the multiple MAC data units.

The method further comprises, prior to receiving the PHY data unit, negotiating, between the first communication device and the second communication device, a maximum number of MAC data units that can be included in a single aggregate MAC data unit in the PHY data unit.

Negotiating the maximum number of MAC data units that can be included in a single aggregate MAC data unit comprises negotiating the maximum number of MAC data units such that the maximum number of MAC data units collectively applies to MAC data units corresponding to multiple traffic classes.

The method further comprises, prior to receiving the PHY data unit, negotiating, between the first communication device and the second communication device, a maximum length of a single aggregate MAC data unit that can be transmitted to the first communication device.

The multiple MAC data units aggregated in the aggregate MAC data unit include respective MAC data units corresponding to each of a plurality of traffic classes.

Generating the acknowledgement data unit comprises generating the acknowledgement data unit to include, for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for multiple MAC data units of the traffic class.

The PHY data unit includes multiple aggregate MAC data units concurrently transmitted by multiple second communication devices, wherein each of the multiple aggregate MAC data units includes respective one or more MAC data units corresponding to each of a plurality of traffic classes.

Generating the acknowledgement data unit comprises generating the acknowledgement data unit to include, for each one of the multiple second communication device and for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for MAC data units of the traffic class.

In another embodiment, a first communication device comprises a network interface having one or more integrated circuits configured to receive, from a second communication device, a physical layer (PHY) data unit, wherein the PHY data unit includes multiple MAC data units aggregated in an aggregate medium access control (MAC) data unit. The one or more integrated circuits are also configured to generate an acknowledgment data unit to acknowledge receipt of the multiple MAC data units, wherein the acknowledgment data unit includes (i) a length indication that indicates a length of an acknowledgement field, and (ii) the acknowledgment field of the indicated length, wherein the acknowledgement field includes respective acknowledgement information for the multiple MAC data units. The one or more integrated circuits are further configured to cause the acknowledgment data unit to be transmitted to the second communication device.

In other embodiments, the first communication device includes any suitable combination of one or more of the following features.

The one or more integrated circuits are further configured to generate the length indication to indicate one of a plurality of predetermined lengths.

Respective predetermined lengths in the plurality of predetermined lengths correspond to respective maximum numbers of MAC data units that can be included in the aggregate MAC data unit.

The one or more integrated circuits are further configured to generate the length indication based on a maximum number of MAC data units previously negotiated between the first communication device and the second communication device.

The plurality of predetermined lengths include a first length of 4 bytes corresponding to a maximum of 32 MAC data units, a second length of 8 bytes corresponding to a maximum of 64 MAC data units, a third length of 16 bytes corresponding to a maximum of 128 MAC data units, and a fourth length of 32 bytes corresponding to a maximum of 256 MAC data units.

The one or more integrated circuits are further configured to generate the acknowledgement field to include a block acknowledgment bitmap having the length indicated by the length indication, wherein each bit of the block acknowledgment bitmap indicates an acknowledgment of a single MAC data unit of the multiple MAC data units.

The one or more integrated circuits are further configured to, prior to receiving the PHY data unit, negotiate, with the second communication device, a maximum number of MAC data units that can be included in a single aggregate MAC data unit.

The one or more integrated circuits are configured to negotiate the maximum number of MAC data units such that the maximum number of MAC data units collectively applies to MAC data units corresponding to multiple traffic classes.

The one or more integrated circuits are further configured to, prior to receiving the PHY data unit, negotiate, with the second communication device, a maximum length of a single aggregate MAC data unit that can be transmitted to the first communication device.

The multiple MAC data units aggregated in the aggregate MAC data unit include respective MAC data units corresponding to each of a plurality of traffic classes.

The one of more integrated circuits are configured to generate the acknowledgement data unit to include, for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for multiple MAC data units of the traffic class.

The PHY data unit includes multiple aggregate MAC data units concurrently transmitted by multiple second communication devices, wherein each of the multiple aggregate MAC data units includes respective one or more MAC data units corresponding to each of a plurality of traffic classes.

The one or more integrated circuits are configured to generate the acknowledgement data unit to include, for each one of the multiple communication device and for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for MAC data units of the traffic class.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for acknowledging a data unit, the method comprising:
    receiving, at a first communication device from a second communication device, a physical layer (PHY) data unit, wherein the PHY data unit includes an aggregate medium access control data unit (MAC) protocol data unit (A-MPDU) that aggregates multiple MAC protocol data units;
    generating, at the first communication device, an acknowledgment data unit to acknowledge receipt of the multiple MAC protocol data units, wherein the acknowledgment data unit includes
        (i) a length indication that indicates a length of an acknowledgement field, the length of the acknowledgement field being selected from a subset of predetermined lengths, among a set predetermined lengths, the subset including multiple predetermined lengths that do not exceed a maximum number of MAC protocol data units that can be included in the A-MPDU, the maximum number of MAC protocol data units being limited by a buffer size negotiated in an acknowledgement setup procedure previously conducted between the first communication device and the second communication device, and
        (ii) the acknowledgment field of the indicated length, wherein the acknowledgement field includes respective acknowledgement information for the multiple MAC protocol data units; and
    transmitting the acknowledgment data unit from the first communication device to the second communication device.

2. The method of claim 1, wherein generating the acknowledgment data unit includes generating the acknowledgement field to include a block acknowledgment bitmap having the length indicated by the length indication, wherein each bit of the block acknowledgment bitmap indicates an acknowledgment of a respective single MAC protocol data unit of the multiple MAC protocol data units.

3. The method of claim 1, wherein:
    the multiple MAC protocol data units aggregated in the A-MPDU include respective MAC protocol data units corresponding to each of a plurality of traffic classes, and
    generating the acknowledgement data unit comprises generating the acknowledgement data unit to include, for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for multiple MAC protocol data units of the traffic class.

4. The method of claim 1, wherein:
    the PHY data unit includes multiple A-MPDUs concurrently transmitted by multiple second communication devices, wherein each of at least some of the multiple A-MPDUs includes respective one or more MAC protocol data units corresponding to each of a plurality of traffic classes, and
    generating the acknowledgement data unit comprises generating the acknowledgement data unit to include, for each one of the multiple second communication devices and for each one of the plurality of traffic classes corresponding to MAC protocol data units included in a respective A-MPDU, of the multiple A-MPDUs, transmitted by the corresponding one of the multiple second communication devices (i) a respective length indication that indicates a respective length of an acknowledgement field corresponding to the traffic class and (ii) a respective acknowledgment field of the corresponding length, wherein the respective acknowledgement field includes respective acknowledgement information for MAC protocol data units of the traffic class.

5. The method of claim 1, further comprising:
    generating, at the first communication device, a management data unit that includes (i) a maximum A-MPDU length field and (ii) an extension maximum A-MPDU length field for indicating a maximum length of a single A-MPDU that can be received by the first communication device, wherein the maximum A-MPDU length field is set to indicate the maximum length if the maximum length is at most a first maximum length and the extension maximum A-MPDU length field is set to indicate the maximum length if the maximum length exceeds the first maximum length, and
    prior to receiving the PHY data unit, transmitting, by the first communication device, the management data unit to at least the second communication device to announce, to the at least the second communication device, the maximum supported A-MPDU length that can be received by the first communication device.

6. The method of claim 5, wherein generating the management data unit includes setting the maximum A-MPDU length field to indicate a first exponent to be used for determining the maximum length if the maximum length is at most the first maximum length and setting the extension maximum A-MPDU length field to indicate a second exponent to be used for determining the maximum length if the maximum length exceeds the first maximum length.

7. The method of claim 5, wherein generating the management data unit comprises generating the management data unit to (i) include the maximum A-MPDU length field in a first capabilities element included in the management data unit and (ii) include the extension maximum A-MPDU length field in a second capabilities element, different from the first capabilities element, included in the management data unit.

8. A first communication device, comprising:
a network interface having one or more integrated circuits configured to
receive, from a second communication device, a physical layer (PHY) data unit, wherein the PHY data unit includes an aggregate medium access control data unit (MAC) protocol data unit (A-MPDU) that aggregates multiple MAC protocol data units,
generate an acknowledgment data unit to acknowledge receipt of the multiple MAC protocol data units, wherein the acknowledgment data unit includes
(i) a length indication that indicates a length of an acknowledgement field, the length of the acknowledgement field being selected from a subset of predetermined lengths, among a set predetermined lengths, including multiple predetermined lengths that do not exceed a maximum number of MAC protocol data units that can be included in the A-MPDU, the maximum number of MAC protocol data units being limited by a buffer size negotiated in an acknowledgement setup procedure previously conducted between the first communication device and the second communication device, and
(ii) the acknowledgment field of the indicated length, wherein the acknowledgement field includes respective acknowledgement information for the multiple MAC protocol data units, and
cause the acknowledgment data unit to be transmitted to the second communication device.

9. The first communication device of claim 8, wherein the one or more integrated circuits are configured to generating the acknowledgement field to include a block acknowledgment bitmap having the length indicated by the length indication, wherein each bit of the block acknowledgment bitmap indicates an acknowledgment of a respective single MAC protocol data unit of the multiple MAC protocol data units.

10. The first communication device of claim 8, wherein:
the multiple MAC protocol data units aggregated in the A-MPDU include respective MAC protocol data units corresponding to each of a plurality of traffic classes, and
the one or more integrated circuits are configured to generate the acknowledgement data unit to include, for each one of the plurality of traffic classes (i) a respective length indication that indicates a respective length of an acknowledgement field corresponding to the traffic class and (ii) a respective acknowledgment field of the corresponding length, wherein the respective acknowledgement field includes respective acknowledgement information for multiple MAC data units of the traffic class.

11. The first communication device of claim 8, wherein:
the PHY data unit includes multiple A-MPDUs concurrently transmitted by multiple second communication devices, wherein each of at least some of the multiple A-MPDUs includes respective one or more MAC protocol data units corresponding to each of a plurality of traffic classes,
and the one or more integrated circuits are configured to generate the acknowledgement data unit to include, for each one of the multiple second communication devices and for each one of the plurality of traffic classes corresponding to MAC protocol data units included in a respective A-MPDU, of the multiple A-MPDUs, transmitted by the corresponding one of the multiple second communication devices (i) a respective length indication that indicates a respective length of an acknowledgement field corresponding to the traffic class and (ii) a respective acknowledgment field of the corresponding length, wherein the respective acknowledgement field includes respective acknowledgement information for MAC protocol data units of the traffic class.

12. The first communication device of claim 8, wherein the one or more integrated circuits are further configured to
generate a management data unit that includes (i) a maximum A-MPDU length field and (ii) an extension maximum A-MPDU length field for indicating a maximum length of a single A-MPDU that can be received by the first communication device, wherein the maximum A-MPDU length field is set to indicate the maximum length if the maximum length is at most a first maximum length and the extension maximum A-MPDU length field is set to indicate the maximum length if the maximum length exceeds the first maximum length, and
prior to receiving the PHY data unit, the management data unit to at least the second communication device to announce, to the at least the second communication device, the maximum supported A-MPDU length that can be received by the first communication device.

13. The first communication device of claim 12, wherein the one or more integrated circuits are configured to set the maximum A-MPDU length field to indicate a first exponent to be used for determining the maximum length if the maximum length is at most the first maximum length and set the extension maximum A-MPDU length field to indicate a second exponent to be used for determining the maximum length if the maximum length exceeds the first maximum length.

14. The first communication device of claim 12, wherein the one or more integrated circuits are configured generate the management data unit to (i) include the maximum A-MPDU length field in a first capabilities element included in the management data unit and (ii) include the extension maximum A-MPDU length field in a second capabilities element, different from the first capabilities element, included in the management data unit.

15. A method for announcing maximum data unit length supported for reception by a first communication device, the method comprising:
generating, at the first communication device, a management data unit that includes (i) a maximum aggregate medium access control data unit (MAC) protocol data unit (A-MPDU) length field and (ii) an extension maximum A-MPDU length field for indicating a maximum length of a single A-MPDU that can be received by the first communication device, wherein generating the management data unit includes setting the maximum A-MPDU length field to indicate the maximum length if the maximum length is at most a first maximum length, and setting the extension maximum A-MPDU length field to indicate the maximum length if the maximum length exceeds the first maximum length; and transmitting the management data unit to one or more second communication devices, to announce the maximum supported A-MPDU length that can be received by the first communication device to the one or more second communication devices.

16. The method of claim 15, wherein generating the management data unit includes setting the maximum A-MPDU length field to indicate a first exponent to be used for determining the maximum length if the maximum length is at most the first maximum length and setting the extension maximum A-MPDU length field to indicate a second exponent to be used for determining the maximum length if the maximum length exceeds the first maximum length.

17. The method of claim 15, wherein generating the management data unit comprises generating the management data unit to (i) include the maximum A-MPDU length field in a first capabilities element included in the management data unit and (ii) include the extension maximum A-MPDU length field in a second capabilities element, different from the first capabilities element, included in the management data unit.

18. A first communication device, comprising:
a network interface having one or more integrated circuits configured to
generate a management data unit that includes (i) a maximum aggregate medium access control data unit (MAC) protocol data unit (A-MPDU) length field and (ii) an extension maximum A-MPDU length field for indicating a maximum length of a single A-MPDU that can be received by the first communication device, the one or more integrated circuits being configured to set the maximum A-MPDU length field to indicate the maximum length if the maximum length is at most a first maximum length, and set the extension maximum A-MPDU length field to indicate the maximum length if the maximum length exceeds the first maximum length, and cause the management data unit to be transmitted to one or more second communication devices, to announce the maximum supported A-MPDU length that can be received by the first communication device to the one or more second communication devices.

19. The first communication device of claim 18, wherein the one or more integrated circuits are configured to set the maximum A-MPDU length field to indicate a first exponent to be used for determining the maximum length if the maximum length is at most the first maximum length and set the extension maximum A-MPDU length field to indicate a second exponent to be used for determining the maximum length if the maximum length exceeds the first maximum length.

20. The first communication device of claim 18, wherein the one or more integrated circuits are configured generate the management data unit to (i) include the maximum A-MPDU length field in a first capabilities element included in the management data unit and (ii) include the extension maximum A-MPDU length field in a second capabilities element, different from the first capabilities element, included in the management data unit.

* * * * *